United States Patent [19]

Takayama et al.

[11] Patent Number: 5,166,979
[45] Date of Patent: Nov. 24, 1992

[54] DATA TRANSMITTING EQUIPMENT

[75] Inventors: Akira Takayama; Tsuneyuki Koikeda, both of Hamamatsu, Japan

[73] Assignee: Yamaha Corporation, Japan

[21] Appl. No.: 744,430

[22] Filed: Aug. 13, 1991

[30] Foreign Application Priority Data

Aug. 13, 1990 [JP] Japan .................................. 2-213986

[51] Int. Cl.$^5$ ............................................. H04K 1/00
[52] U.S. Cl. ....................................... 380/49; 380/23; 395/725
[58] Field of Search ............................ 380/23, 25, 49; 365/244; 395/725

[56] References Cited

U.S. PATENT DOCUMENTS

| | | | |
|---|---|---|---|
| 4,348,696 | 9/1982 | Beier .................................. | 358/349 |
| 4,758,718 | 7/1988 | Fujisaki et al. ..................... | 235/487 |
| 4,806,745 | 2/1989 | Oogira ................................ | 235/492 |
| 4,926,388 | 5/1990 | Kunita et al. ....................... | 365/244 |
| 4,926,481 | 2/1990 | Collins, Jr. ......................... | 380/25 |
| 5,042,067 | 8/1991 | Moriyama ........................... | 380/49 |
| 5,060,263 | 10/1991 | Bosen et al. ....................... | 380/25 |

Primary Examiner—Salvatore Cangialosi
Attorney, Agent, or Firm—Scully, Scott, Murphy & Presser

[57] ABSTRACT

A data transmitting equipment transmitting data between a desired remote equipment connected via communication line, comprising password setting means, communication control means and status display means. The password set by a user is stored in the password setting means. Transmission control means compare said password with a set password in a remote equipment, allow said data transmitting of said data if both passwords are consistent, delete said set password when said transmitting ended. If the password of the password setting means is not deleted, status display means show that said password remains in the password setting means. According to the above mentioned present invention the password is automatically deleted after the end of the data transmission, and moreover the set password is never displayed during or after use. Accordingly, an exposure of the password to a third party is prevented. Because the status of whether or not a password was set is displayed, as the need arises the user may reset the password as described above. Though the set password itself is not displayed, this is no impediment for the setting operation of the password.

8 Claims, 6 Drawing Sheets

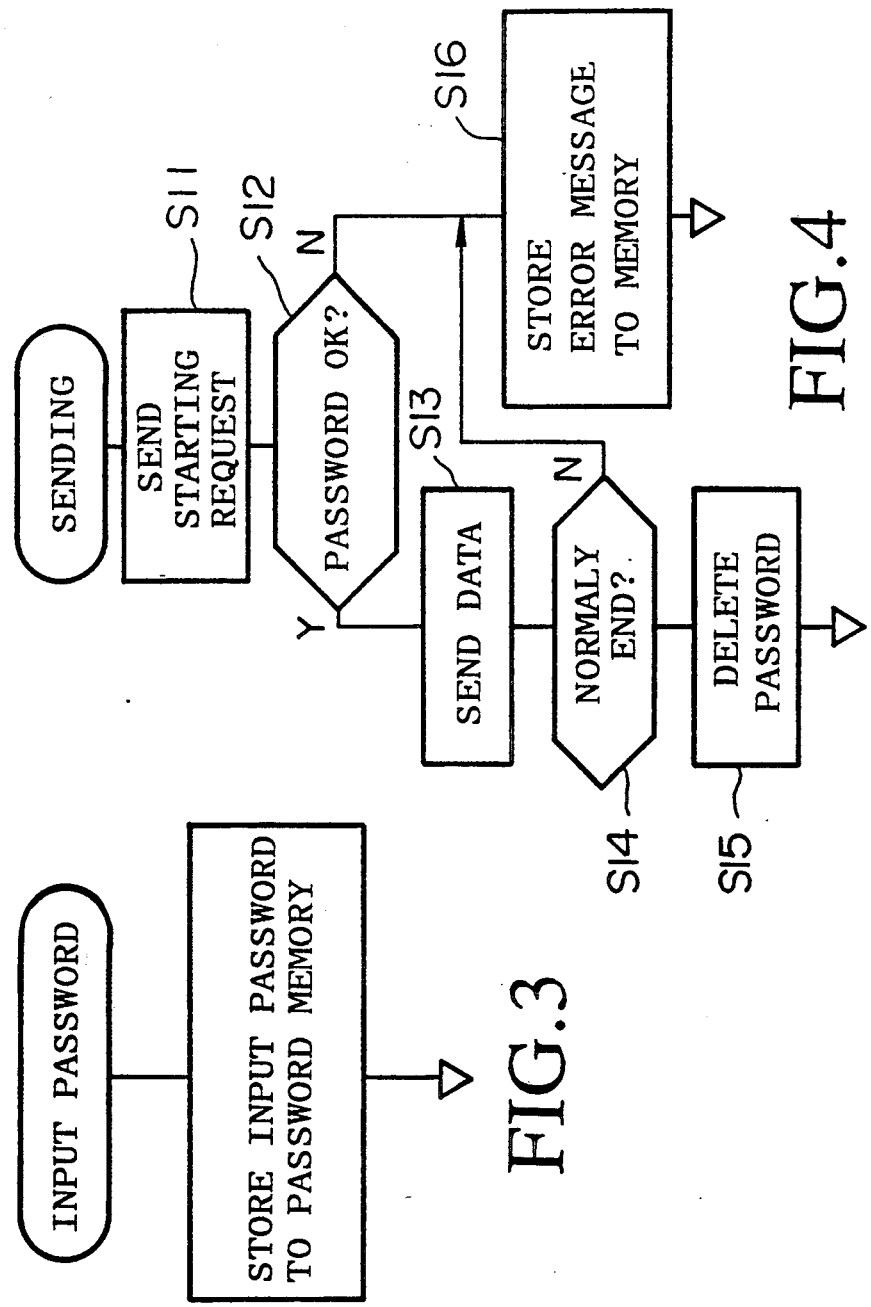

| DIAL NUMBER | PASSWORD | STARTING TIME |
|---|---|---|
| □ □ □ □ | □ □ □ □ | □□:□□:□□ |
| ▲ ▲ ▲ ▲ | ▲ ▲ ▲ ▲ | ▲▲:▲▲:▲▲ |
| | | |

FIG. 6

| DIAL NUMBER | PASSWORD |
|---|---|
| | |
| | |

FIG. 7

| DIAL NUMBER | COMMON PASSWORD |
|---|---|
| | |
| | |

FIG. 8

DATA TRANSMITTING EQUIPMENT

BACKGROUND OF THE INVENTION

1. Field of the Invention

The present invention relates to a data transmitting equipment carrying out data transmission via a communication line.

2. Prior art

Data transmission equipment sending and receiving data between a desired remote equipment via a communication line is known. Hand in hand with the beginning of ISDN service (Integrated Service Digital Network) and because of the possibility of high speed transmission of any unprocessed digital data, the development of data transmitting equipment making use of this has been advanced. When data transmission is done via communication lines, confirmation of the identity of the communication partner is difficult and therefore, originally, there is a danger that data are erroneously transmitted to a party not qualified for receiving data. One of the methods for preventing data transmissions to a party having no reception qualifications, is the use of a password. This means that a password is to be decided beforehand between the party sending the data and the legitimate receiver of the data. Then, before starting to transmit data, sender and receiver respectively have to input the password in the data transmitting equipment and the passwords of both parties are compared via a communication line, and only when the passwords of the two sides are consistent, data supply from the sender's side to the receiver's side is permitted.

In data transmitting equipment of prior art the input password was maintained in the data transmitting equipment after the end of the data transmission. In case the user forgets to eliminate the password, the problem is, that the password is exposed to another person using the data transmitting equipment thereafter. For avoiding this exposure the user always has to worry about the delete of the password.

SUMMARY OF THE PRESENT INVENTION

In consideration of the above description, it is an object of the present invention to prevent the exposure of the password to somebody else, further to provide a data transmitting equipment where, when a password is used, there is nothing to worry about.

The present invention provides a data transmitting equipment for transmitting data between a local equipment and a remote equipment connected via communication lines, said data transmitting equipment comprising:

a) password setting means for storing a first password set by a user at the local site;

b) communication control means for comparing said first password and a second password set in the remote equipment, permitting transmitting of said data when both passwords are identical, deleting said first password when said transmitting ended; and c) display means for displaying a status which indicates said first password is not deleted and remains in said password setting means, wherein said first password is not displayed except when said password is set.

According to the above mentioned present invention, the password is automatically deleted after completion of data transmission. The set password is not at all shown during or after use. Therefore the exposure of a password to a third party is prevented. And because the status display shows whether a password is set or not, the user can reset a password as described above when needed. Though the password itself is not displayed the operation of setting a password is not obstructed.

According to the present invention, the password set by the user is not displayed, it is automatically deleted after completion of data transmission and because it is displayed whether a password is set or not, the exposure of the password to a third party is prevented and the trouble related when dealing with passwords is annulled.

BRIEF DESCRIPTION OF THE DRAWINGS

FIG. 3–5 show a flowchart of the actions of the same embodiment.

FIG. 6 explains the password setting procedure on second preferred embodiment of the present invention.

FIG. 7–9 explain the password setting procedure on third and fourth preferred embodiment of the present invention.

DESCRIPTION OF THE PREFERRED EMBODIMENTS

In the following, the preferred embodiments of the present invention will be described in detail with reference to drawings.

FIRST PREFERRED EMBODIMENT

Figure 1:
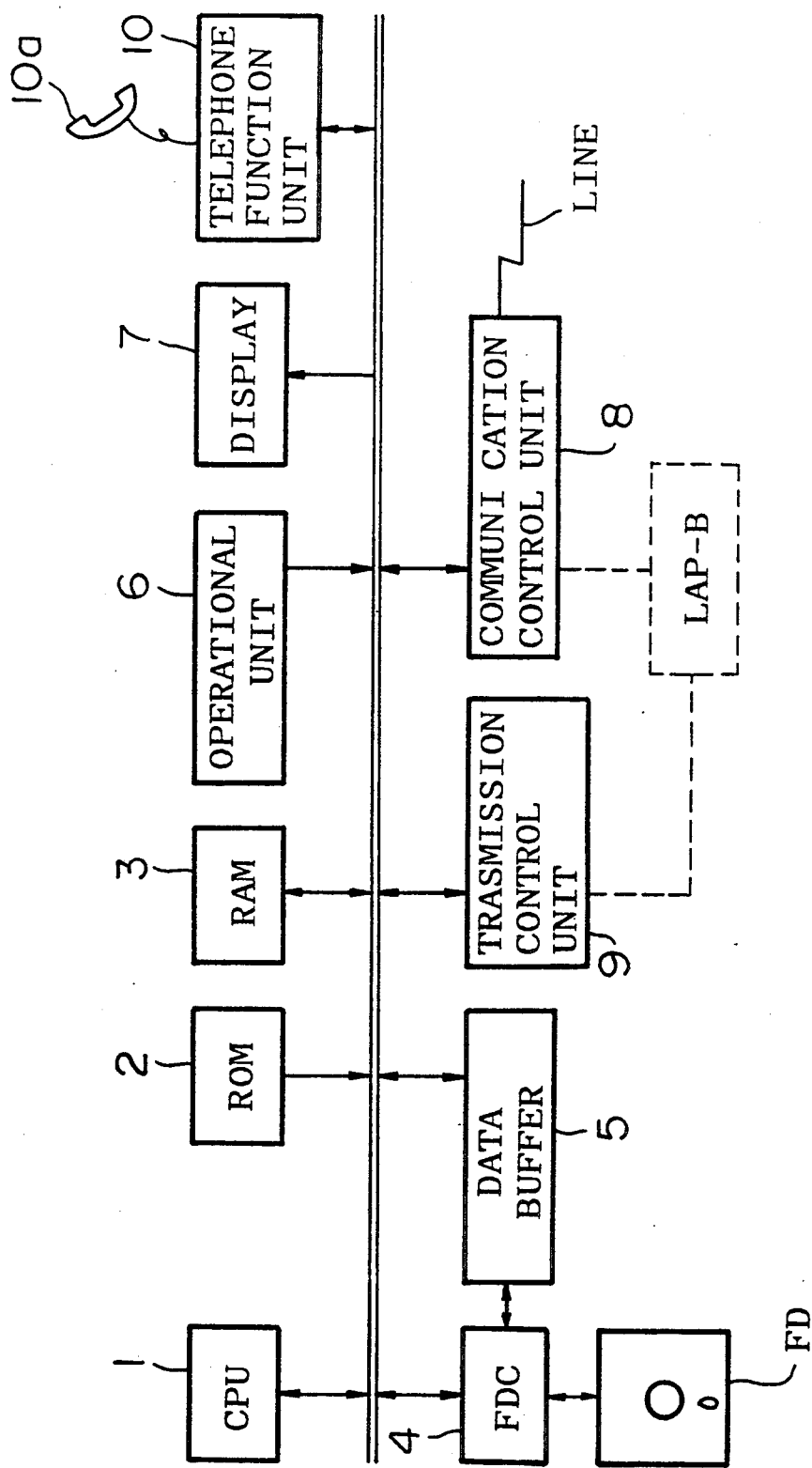
FIG. 1 shows a block diagram of the construction of the data transmitting equipment according to first preferred embodiment of the present invention.

FIG. 1 is a block diagram showing the construction of the data transmitting equipment according to a first preferred embodiment of the present invention. In FIG. 1, a CPU 1 (central processing unit) controls the whole equipment, a ROM 2 (read only memory) stores a control program processed by CPU 1, a RAM 3 (random access memory) is used as a temporary data store when CPU 1 is processing operations. An FDC 4 (floppy disk controller, called FDC hereafter) controls the reading of data from a floppy disk and the writing of data on a floppy disk, a databuffer 5 is used as a temporary storage for the data transmitted via FDC. An operational unit 6 detect all kinds of operation information, such as those from operation buttons arranged on an operation panel of the data transmitting equipment and sends said operation information to the corresponding units. Messages are displayed on a display 7.

Further there is a line control unit 8 and a communication control unit 9.

The control program for executing protocol LAP - B (balanced link access protocol) and protocol LAP - D (D channel link access protocol) is stored in ROM 2. These protocols are in conformity with the CCITT (counseling committee for international telephone and telegraph) recommendation. Since CPU 1 runs a control program according to LAP - D or LAP - B protocols, the control of call setting done by line control unit 8, the control of establishment and release of the datalinks of channel D and B, and control of transmitting and receiving signals done by communication control unit 9 are proceeded. The FD transmission protocol regulating the process for sending memorized data from the FD is provided as the upper class protocol of the LAP - B protocol; this control program which is in conformity with the FD transmission protocol is stored in ROM 2. When CPU 1 runs the control program which is in accordance with this FD transmission protocol, FDC 4 and communication control unit 9 are controlled. A telephone function unit 10 connected with a receiver 10a, controls transmission and reception of voice signals and converts analog signals into digital signals and back when the user has a voice communication with an other party. A system bus SB is used for data transmissions between all the elements explained before.

Figure 2:
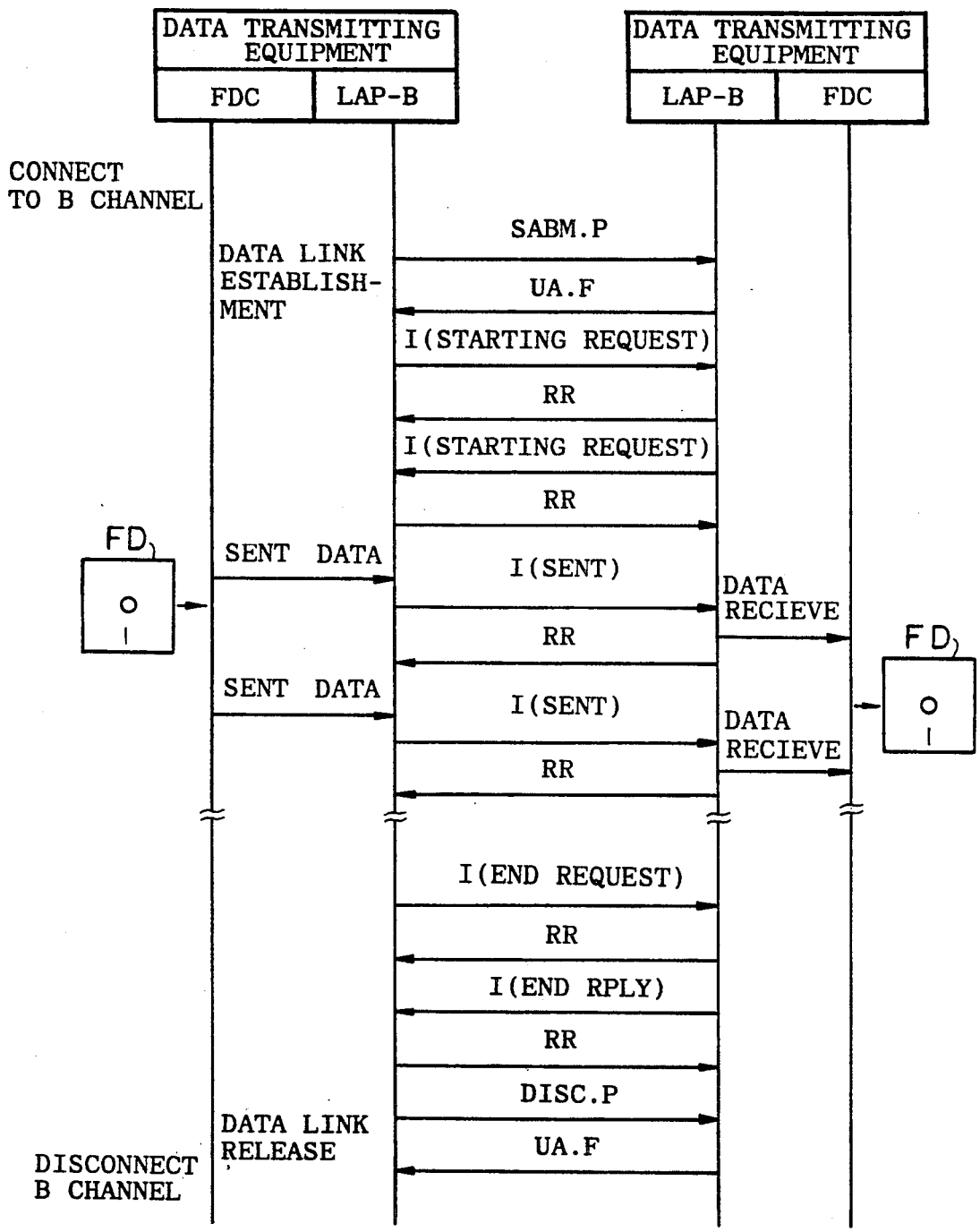
FIG. 2 shows the sequence of the actions of the same embodiment.
Figure 5:
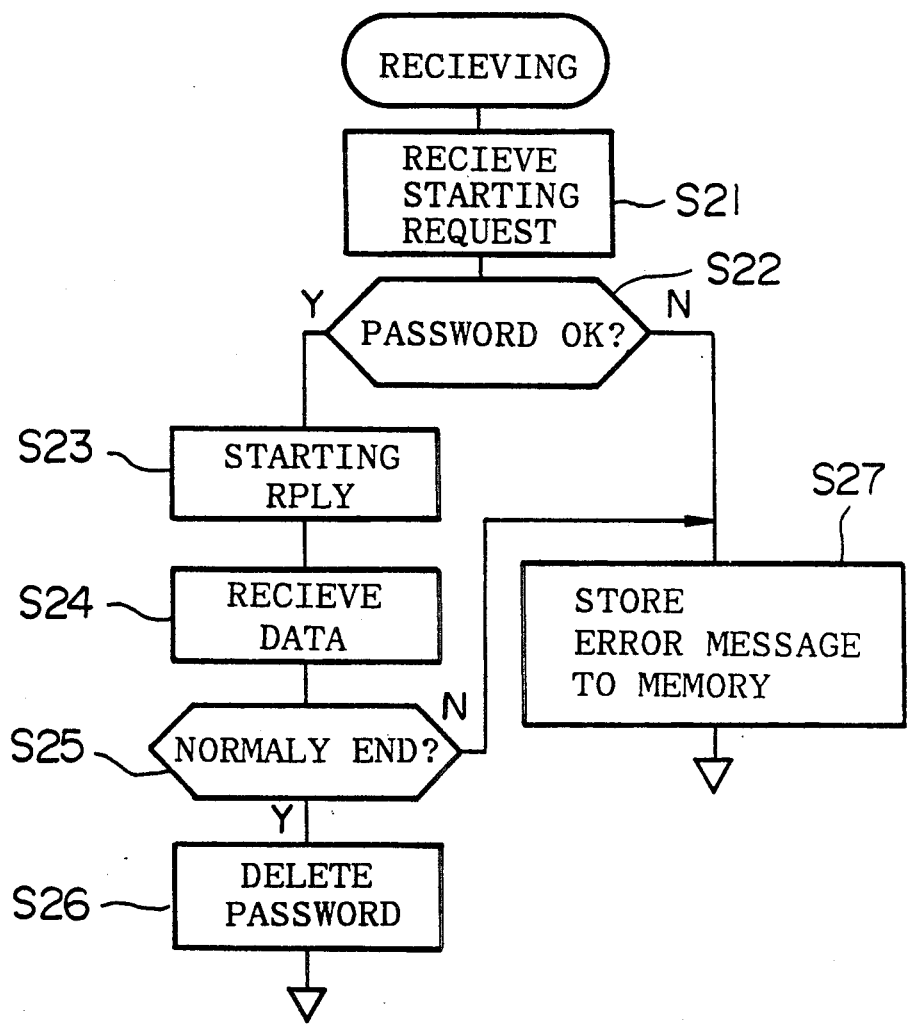
Figure 9:
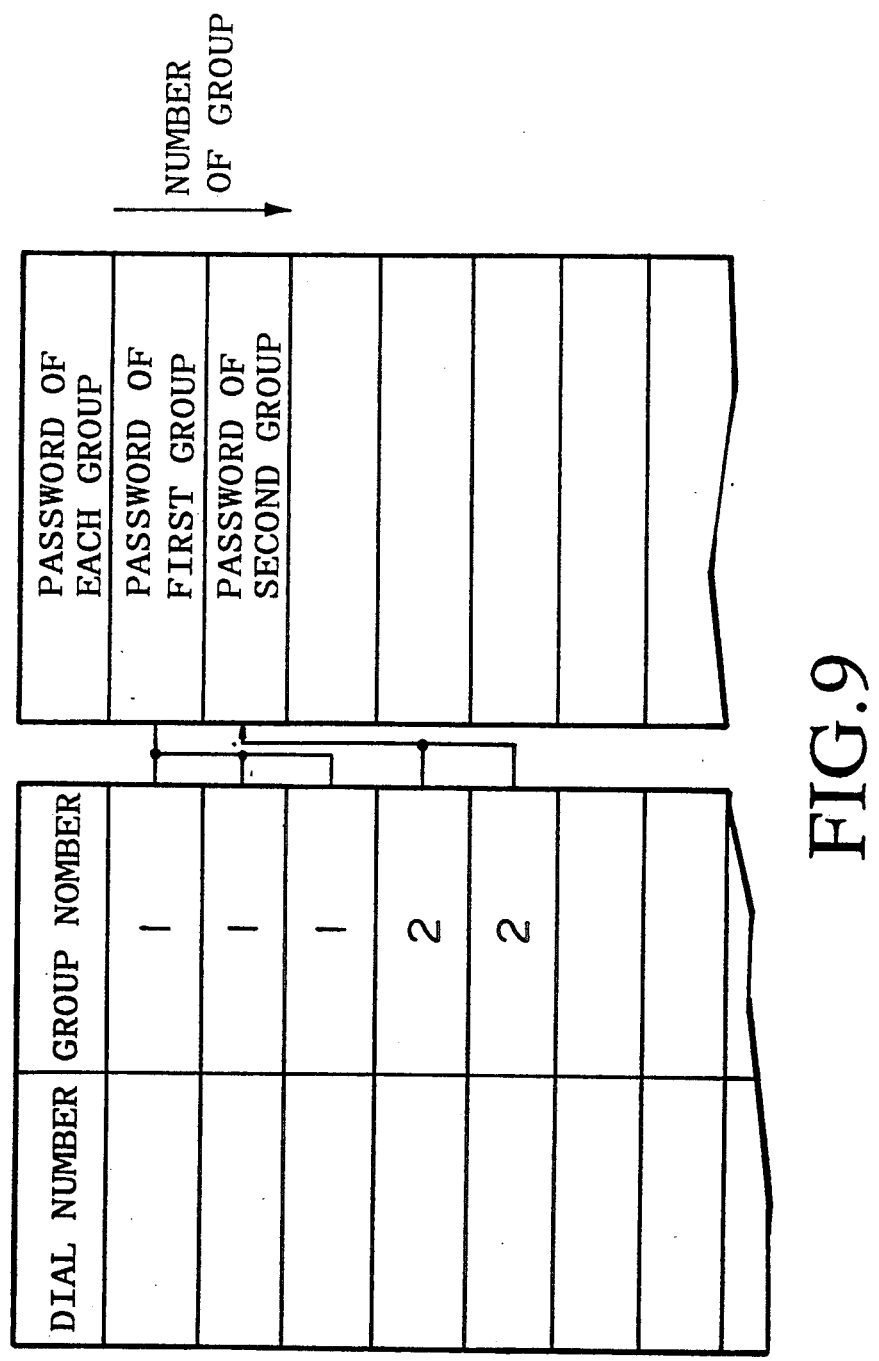

The following refers to the sequence shown in FIG. 2 and to the flowcharts shown in FIG. 3-5 and explains the present preferred embodiments.

Before transmitting data, the sending party and the receiving party secretly decide on a password beforehand and input it in the data transmitting equipments. The password input in conformity of each party is stored in the password memory table of RAM 3 of each data transmitting equipment, as shown in FIG. 3. The input password is only stored in RAM 3, only displayed when set and once set never displayed on the outside again. Thus the password setting is completed in each data transmitting and data receiving equipment. All users put the FD in the FDD (floppy disk drive unit) of the data transmitting equipment.

The user who intends to transmit data takes up the receiver 10a. The telephone function unit 10 detects that the receiver has been taken up and indicates to line control unit 8 and communication control unit 9 to output a dialtone. The user who confirmed the dialtone inputs the dial-number and then presses the start button. The SETUP message request which demands to connect the dial number input by the user into a called party's number is sent from communication control unit 8 to the network. Then, the SETUP message is sent to the data transmitting equipment on the remote called side via network and received by communication control unit 8 of the data transmission equipment on the called side.

When the data transmitting equipment on the receiver's side is set on automatic reply mode, the (call) CONNECT coming back from communication control unit 8 is instantaneously put on the network (call). However, in case of manual answering (reply) mode, a call ringer tone is produced by the ringing circuit. The CONNECT is put on the network by pressing the start button after confirming the call signal tone by the user. Based on this, the communication line is connected between the data transmitting equipment on the receiver's side and on the sender's side. If the information service of the sender's number which is to give notice about the sender's dial number, is specified, the sender's (phone) number supplied via line control unit 8, is loaded into the memory table of RAM 3 by CPU 1 and displayed on the display unit of the data transmitting equipment on the receiver's side.

As shown in FIG. 2, the command SABM.P demanding the set-up of the datalink according to ABM mode (asynchronous balanced mode) is sent from the sender's data transmitting equipment to the receiver's data transmitting equipment. When the receiver's data transmitting equipment has the possibility to correspond according to ABM mode, the UA.F command is sent to the sender's data transmitting equipment. In this way, the datalink via B channel between the sender and the receiver is set up and transceiving by I-frame (information frame) becomes possible. Then, in the sender's data transmitting equipment the routine as shown in FIG. 4 is started. In the receiver's data transmitting equipment the routine as shown in FIG. 5 is started.

CPU 1 of the sender's data transmitting equipment reads the password out from RAM 3 and together with this password supplies the indication of transmission of the starting demand to the communication control unit 9 (step S11 in FIG. 4). As a result of this, the command of the starting demand which contains the password is sent by means of communication control unit 9 as an I-frame.

When this I-frame is received by communication control unit 9 of the receiver's data transmitting equipment, the RR (receive ready) command, described hereinafter, is sent from the receiver's data transmitting equipment to the sender's data transmitting equipment. Further, the password in the received I-frame is taken into CPU 1 (as shown in step S21 of FIG. 5). Then, it is decided by CPU 1 whether the password sent by the sender's data transmitting equipment and the password in RAM 3 of the same machine are consistent or not (as shown in step S22 of FIG. 5). If the result of this decision is "No", an error message is stored in a fixed area of RAM 3 by CPU 1 and the process is terminated. The display information is sent to the display unit and the display "password still there" along with an error message describing the reason of the obstacle of that time is shown. The user recognizes from the error message caused by the obstacle that the result of the comparison of the passwords was a failure and data transmission was refused. In case there are many reasons of obstacles besides failure of password, then it is very convenient for the user if the information showing the reason of this obstacle is sent as an I-frame of the starting reply from the receiver to the sender. If, on the other hand, the result of the decision of step S22 is "Yes", the indication of sending the starting reply is given to communication control unit 9 by means of CPU 1 (step S23) and the I-frame of the starting reply (response) is transmitted by communication control unit 9.

If this I-frame is received by communication control unit 9 of the sender's data transmitting equipment, the RR (receive ready) command, described hereinafter, is sent from the receiver's data transmitting equipment to the sender's data transmitting equipment and taken in by CPU 1, and it is decided by CPU 1 whether the content of the I-frame is a starting reply or not, in other words, whether the result of the comparison of the passwords at the receiver's side was successful or not (step S12 of FIG. 4). If the result of this decision is "Yes", step S13 follows and a fixed amount of memory data in FD is read out by FDC 4, sent to communication control unit 9 via databus 5 and sent as an I-frame to the receiver's data transmitting equipment(step S13 of FIG. 4).

The I-frame of the sender's side is received by communication control unit 9 of the receiver's data transmitting equipment and written on FD via data buffer 5 and FDC 4 (step S24 of FIG. 5). Then, the RR (receive ready) command, normally showing the action of the receiver, is sent from the receiver's data transmitting equipment to the sender's data transmitting equipment. When this RR command is received by communication control unit 9 of the sender's data transmitting equipment, a fixed amount of written data in FD is read out beforehand by FDC 4, data stored in data buffer 5 are sent to communication control unit 9 and sent to the receiver's data transmitting equipment as an I-frame. After that data are transmitted similarly.

If, on the other hand, the starting reply command from the receiver's data transmitting equipment is not sent, the result of the decision of step S12 becomes "No" and step S16 follows. The display information for errors is loaded to a fixed area of RAM 3 by CPU 1. The display information for an error is sent to display unit 7. An error message showing a directive saying that the password remains undeleted, is displayed on an LCD 10 and the routine is finished. By confirming the display of the LCD, the user confirms that the result of the comparison of the passwords was a failure and the data transmission failed.

When the transmission of all data stored in FD is concluded, an I-frame of the transmission end request is sent from communication control unit 9 of the sender's data transmitting equipment. When this I-frame is received by transmission unit 9 of the receiver's data transmitting equipment, the RR (receive ready) command, described hereinafter, is sent from the receiver's data transmitting equipment to the sender's data transmitting equipment, and the I-frame of the end reply is transmitted by communication control unit 9 and sent to the sender's data transmitting equipment. By receiving this I-frame of the reply end, the receiver's data transmitting equipment sends the RR (receive ready) command, described hereinafter, from the receiver's data transmitting equipment to the sender's data transmitting equipment. Further the command DISC.P, which demands the termination of the data link, is sent from the sender's data transmitting equipment to the receiver's data transmitting equipment, and an UA.F command, which stands for the response of the link termination, is sent from the receiver's data transmitting equipment to the sender's data transmitting equipment. By this, the datalink ends and the B channel for data transmission is cut.

When the data transmission is terminated, it is decided in the sender's data transmitting equipment whether transmission was terminated normally or not( step S14 of FIG. 4). If the result of this decision is "Yes", the password memory table in RAM 3 is cleared by CPU 1. When the data transmission was not normally terminated, the result of the decision of step S14 becomes "No" and step S16 follows and an error message showing a directive that the password was not deleted, is loaded to a fixed area of RAM 3. Also in the receiver's data transmitting equipment it is decided whether the transmission was terminated normally or not (step S25 of FIG. 5). If the result of this decision is "Yes" the password in RAM 3 is deleted by CPU 1. When the transmission was not normally terminated, an error message showing a directive that the password was not deleted, is loaded to a fixed area of RAM 3 (step S27).

According to the preferred embodiment, the password is only displayed at the data transmitting equipment when set. But when the password remains, the user can reset or change the password as explained above when necessary because of the shown directive. Though the password itself is not displayed, handling the password by the user is no problem.

SECOND PREFERRED EMBODIMENT

This preferred embodiment is an application of the present invention on data transmitting equipment which transmits according to a beforehand set schedule between many remote equipments. For transmitting data to all remote equipments, the user on the sender's side inputs into the data transmitting equipment the dial numbers or destination address of the data transmitting equipment of the remote sites, the passwords and the transmission schedule originating from the transmission time fixed between the users of the equipment of the partners. This transmission schedule is stored in the memory of the data transmitting equipment in the form as shown in FIG. 6. Supervision of time is executed by the sender's data transmitting equipment. If one of the transmitting times of said transmitting schedule stored in the memory becomes valid, an automatic call of the equipment of the remote sites' dial number of the above mentioned schedule is released and a procedure comparing passwords, similar to the one of preferred embodiment 1, is carried out and data are transmitted. Then the data transmission is normally terminated and the password corresponding to the remote equipment is cleared.

THIRD PREFERRED EMBODIMENT

This preferred embodiment is an application of the present invention on data transmitting equipments having a polling function. When data transmission is executed by polling, the password and the dial number of the equipment of the remote sites which are supposed to receive the data are set at the sender's data transmitting equipment. In case of this preferred embodiment, the user may chose between 3 possible ways of setting the password. If the user chooses the first way of setting, the input of the password and the dial number is received by the equipment of each remote site. The table of the dial numbers and the passwords of the equipment of each remote site is stored in the memory as shown in FIG. 7. If the user chooses the second way of setting, the input of the dial numbers of the remote equipments is successively accepted together with the input of the password in common with the equipment of all remote sites. The table as shown in FIG. 8 is stored in the memory. If the user chooses the third way of setting, the input of the dial number of the remote equipments of a series in each group is accepted together with the input of the password which the equipment of all the remote sites within the group have in common. The table of the dial number of the remote site and the group number of these remote sites, and the table of every's group password is stored in the memory. By each of these ways, the sender's data transmitting equipment is set to the polling mod and awaits the incoming call after the setting of passwords and the remote sites' dial number has been completed.

If a call set demand from an equipment of a remote site is received and followed by a polling demand, the dial number which coincides with the calling number contained in the set call demand is chosen out of all dial numbers in the table which itself is stored in the memory. The comparison of the according password to this dial number and the password sent by the remote equipment is achieved by a process similar to that of the first preferred embodiment. If the result of this comparison was positive, data are transmitted to the remote equipment where the polling demand originated.

The process, if data transmission is terminated, varies according to which of the three set ways 1-3 the password set was done. If the first setting way was used, the password of the remote equipment is deleted immediately once the data transmission ended normally. When it did not end normally the password and dial number of the remote equipment remains in the memory. If the second setting way was used and data transmission towards all remote equipments is completed, common passwords are deleted. If an error turns up in one of the data transmissions towards the remote equipments, the password is not cleared and the dial number of the remote equipment where the error turned up is also maintained. If the third setting way was used, at the time when the data transmission to all remote equipments belonging to each group ended normally, the password corresponding to this group is deleted. If an error turns up in the data transmission to one of the remote equipment belonging to the same group, the password is not deleted.

FOURTH PREFERRED EMBODIMENT

This preferred embodiment is an application of the present invention on data transmitting equipment equipped with a function to transmit the same information successively. The passwords and dial numbers of a group of remote equipments which are to receive identical data, are input to the sender's data transmitting equipment. Dial numbers and passwords are stored in the memory of the sender's data transmitting equipment. In this case, it is possible to apply the three ways of setting a password as explained in above mentioned third preferred embodiment. If the user on the sender's side presses the start button after the passwords and the dial numbers of the remote equipments have been set, the passwords and the dial numbers of the remote equipments stored in the memory are successively read out, an automatic call is sent to the remote equipments, passwords are compared, and when the result of the password comparison is positive, data are transmitted. Regarding the process after the end of the data transmission, since it is quite similar to above mentioned preferred embodiment 3, it is omitted.

In each of the above mentioned preferred embodiments was description was given for the case that the password is compared at the receiver's side. However, the field of application of the present invention is not restricted to password comparison at either the receiver's side or the sender's side. For example, for thoroughly protecting data against ill intentioned calls or other practices, a method can be thought of which compares the password at the sender's side, or at the sender's and the receiver's side, but even if these methods are used, it is obvious that the present invention can be applied.

As explained above, according to the present invention the password set by the user is not displayed, automatically deleted after the end of the transmission, and since the status of existence of a password when set is displayed, the exposure of the password to a third party is prevented and the effect of dealing with the password more conveniently was gained.

What is claimed is:

1. Data transmission equipment for transmitting data between a local equipment and a remote equipment connected via communication lines, said data transmission equipment comprising:
    a) password setting means for storing a first password set by a user at the local site;
    b) communication control means for comparing said first password and a second password set in the remote equipment, and permitting transmission of said data when both passwords are identical, said communication control means deleting said first password when said data transmission is ended; and
    c) display means for displaying a status which indicates when said first password is not deleted and remain in said password setting means, and said display means displaying said first password only when said first password is first set by a user at the local site and not thereafter.

2. Data transmission equipment according to claim 1, further comprising:
    a) schedule memory means for storing schedule information containing a dial number and an optional password for each equipment at the remote site;
    b) line control means for controlling a connection of a communication line to a remote equipment according to said schedule information; and
    c) wherein said transmission control means compares a second password of said remote equipment connected by a communication line and a first password contained in the schedule information which corresponds to said remote equipment, and transmits data to said remote equipment when both passwords are identical, and said communication control means deletes the password contained in said set schedule information when said data transmission ends.

3. Data transmission equipment according to claim 1:
    a) wherein said password setting means stores the first password used for each call received from equipment among a group of remote equipments which have requested transmission of data from the local station; and
    b) wherein said communication control means which is in said remote equipment compares a second password stored in a remote equipment connected by a communication line and a first password stored by means of said password setting means, and transmits data when the first and second passwords are identical, and deletes said first password when the data transmission ends to all the remote equipments for which this password is used.

4. Data transmission equipment according to claim 3, wherein a first password stored by said password setting means is unique and commonly used for calling each member of a group of remote equipments.

5. Data transmission equipment according to claim 3, wherein a first password stored by said password setting means is used for calling one group of remote equipments out of groups in which said remote equipments are divided.

6. Data transmission equipment according to claim 1:
    a) wherein said password setting means stores a first password used for calling each equipment of said group of remote equipments to which the same data information is to be transmitted; and
    b) wherein said data communication control means compares, in each of the remote equipment which are to be transmitted the same information, said first password with the password of the remote equipments stored by said password setting means in the equipment, and transmits the said same data information to each of the remote equipments if the passwords are identical, and deletes said password when the transmissions end of the same information for which the password was used.

7. Data transmission equipment according to claim 1, wherein a first password stored by said password setting means is unique and commonly used for calling each member of a group of remote equipments.

8. Data transmission equipment according to claim 1, wherein a first password stored by said password setting means is used for calling one group of remote equipments out of groups in which said remote equipments are divided.

* * * * *